US010569472B2

(12) United States Patent
Zhang

(10) Patent No.: US 10,569,472 B2
(45) Date of Patent: Feb. 25, 2020

(54) 3D PRINTER CAPABLE OF MULTIPLE SUB-PRINTING ACTIONS, AND SUB-PRINTING METHOD FOR USING THE SAME

(71) Applicants: XYZPRINTING, INC., New Taipei (TW); KINPO ELECTRONICS, INC., New Taipei (TW)

(72) Inventor: Yan-Rong Zhang, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 42 days.

(21) Appl. No.: 15/914,824

(22) Filed: Mar. 7, 2018

(65) Prior Publication Data

US 2019/0168457 A1   Jun. 6, 2019

(30) Foreign Application Priority Data

Dec. 4, 2017   (CN) .......................... 2017 1 1262534

(51) Int. Cl.
*B29C 64/393*   (2017.01)
*B29C 64/135*   (2017.01)
(Continued)

(52) U.S. Cl.
CPC .......... *B29C 64/393* (2017.08); *B29C 64/135* (2017.08); *G06F 3/1208* (2013.01);
(Continued)

(58) Field of Classification Search
None
See application file for complete search history.

(56) References Cited

U.S. PATENT DOCUMENTS

2015/0057784 A1*  2/2015  Butler ................. B29C 67/0088
                                                                   700/119
2015/0165691 A1*  6/2015  Mark ...................... G05B 15/02
                                                                    700/98
2017/0176977 A1   6/2017  Huang et al.

FOREIGN PATENT DOCUMENTS

JP       H0671761 A      3/1994
JP       2001277368 A   10/2001
(Continued)

OTHER PUBLICATIONS

Search Report dated Aug. 3, 2018 of the corresponding European patent application.

(Continued)

*Primary Examiner* — Bernard G Lindsay
*Assistant Examiner* — Saad M Kabir
(74) *Attorney, Agent, or Firm* — Chung-Ming Shih; HDLS IPR Services

(57) ABSTRACT

A sub-printing method for a 3D printer (1) includes following steps: obtaining slicing data (3) of a printing layer by the 3D printer (1) when performing printing; executing a logical segmentation action on the slicing data (3) according to a default segment-template (101) for generating multiple printing blocks (4); labelling each printing block (4) according to a default printing rule for deciding printing orders of the multiple printing blocks (4); controlling the 3D printer (1) to perform multiple sub-printing actions successively according to the printing blocks (4) based on the decided printing orders; and, re-executing above steps before all printing layers of a 3D model are completely printed.

15 Claims, 14 Drawing Sheets

(51) Int. Cl.
  *G06F 3/12*    (2006.01)
  *B33Y 30/00*   (2015.01)
  *B33Y 50/02*   (2015.01)
  *B33Y 10/00*   (2015.01)
  *B29C 64/118*  (2017.01)

(52) U.S. Cl.
  CPC ............ *B29C 64/118* (2017.08); *B33Y 10/00* (2014.12); *B33Y 30/00* (2014.12); *B33Y 50/02* (2014.12)

(56) References Cited

FOREIGN PATENT DOCUMENTS

| | | |
|---|---|---|
| JP | 2009132125 A | 6/2009 |
| JP | 2009132127 A | 6/2009 |
| JP | 2011500382 A | 1/2011 |
| WO | 2017200527 A1 | 11/2017 |

OTHER PUBLICATIONS

Office Action dated Mar. 5, 2019 of the corresponding Japan patent application.

\* cited by examiner

3D PRINTER CAPABLE OF MULTIPLE SUB-PRINTING ACTIONS, AND SUB-PRINTING METHOD FOR USING THE SAME

BACKGROUND OF THE INVENTION

1. Technical Field

The technical field relates to a 3D printer and a printing method, and specifically relates to a 3D printer capable of multiple sub-printing actions, and a sub-printing method for using the same.

2. Description of Related Art

According to the maturity of 3D printing technology, and the narrowed volume and reduced price of the 3D printers, the utilization of the 3D printers has become popular these days.

General speaking, before a 3D printer starts printing, a processor needs to be used to first execute a slicing process to a 3D object for generating multiple records of slicing data of multiple printing layers. When performing printing, the 3D printer is to print each slicing object corresponding to each printing layer according to each record of slicing data, layer by layer, and ultimately fabricates a physical 3D model by stacking the multiple printed slicing objects.

As mentioned above, every types of 3D printers in the market are printing layer by layer, which means the 3D printers are printing an entire slicing object corresponding to whole printing layer at a time. However, if the square measure of the slicing object is way too big, the printed slicing object may occur warping or deformation due to the pulling and dragging caused by the temperature or the stressing and/or the shrinking generated when printing the slicing object. Therefore, the structure of a printed physical 3D model will be unstable, and it may also cause the failure of printing.

SUMMARY OF THE INVENTION

The invention is directed to a 3D printer capable of multiple sub-printing actions and a sub-printing method for using the same, which may separately perform multiple sub-printing actions to print multiple printing blocks with a small square-measure and then constitutes an entire object corresponding to the whole printing layer through the multiple printing blocks, so as to prevent the printed object from occurring warping or deformation.

In one of the exemplary embodiments of the present invention, the 3D printer includes:

a processor, configured to record a segment-template;

a tank, arranged to contain material liquids;

a printing platform, arranged upon the tank and electrically connected with the processor, configured to be controlled by the processor to immerse in the material liquids;

an illuminating unit, arranged below the tank and electrically connected with the processor, configured to be controlled by the processor to illuminate light toward a bottom of the printing platform;

wherein, the processor is configured to obtain a record of slicing data corresponding to one of a plurality of printing layers of a 3D object when performing printing, and to perform a logical segmentation action to the slicing data according to the segment-template for generating a plurality of printing blocks, and the processor is further configured to perform a labelling action respectively to each of the printing blocks according to a printing rule for deciding a printing order of each of the printing blocks;

wherein, the processor is configured to control the illuminating unit to separately perform multiple sub-illuminating actions according to the plurality printing blocks based on the decided printing order for printing a slicing object corresponding to the printing layer.

In one of the exemplary embodiments of the present invention, the sub-printing method is adopted by a 3D printer for printing a physical 3D model corresponding to a 3D object and includes following steps:

a) obtaining a record of slicing data corresponding to one of a plurality of printing layers of the 3D object;

b) performing a logical segmentation action to the slicing data according to a segment-template for generating a plurality of printing blocks;

c) performing a labelling action respectively to each of the printing blocks according to a printing rule for deciding a printing order of each of the printing blocks;

d) controlling the 3D printer to separately perform multiple sub-printing actions according to the plurality of printing blocks based on the decided printing order;

e) determining whether the physical 3D model is printed completely after the plurality of printing blocks of the slicing data are all printed completely; and f) re-executing the step a) to the step d) before the physical 3D model is printed completely.

In comparison with related arts, the present invention performs multiple sub-printing actions to separately print multiple printing blocks with a small square-measure for constituting an entire slicing object with a big square-measure, so as to prevent the printed slicing object from occurring warping or deformation due to the pulling and dragging caused by the temperature or the stressing and/or the shrinking generated when directly printing the whole slicing object at one time.

DETAILED DESCRIPTION OF THE INVENTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

Figure 1:
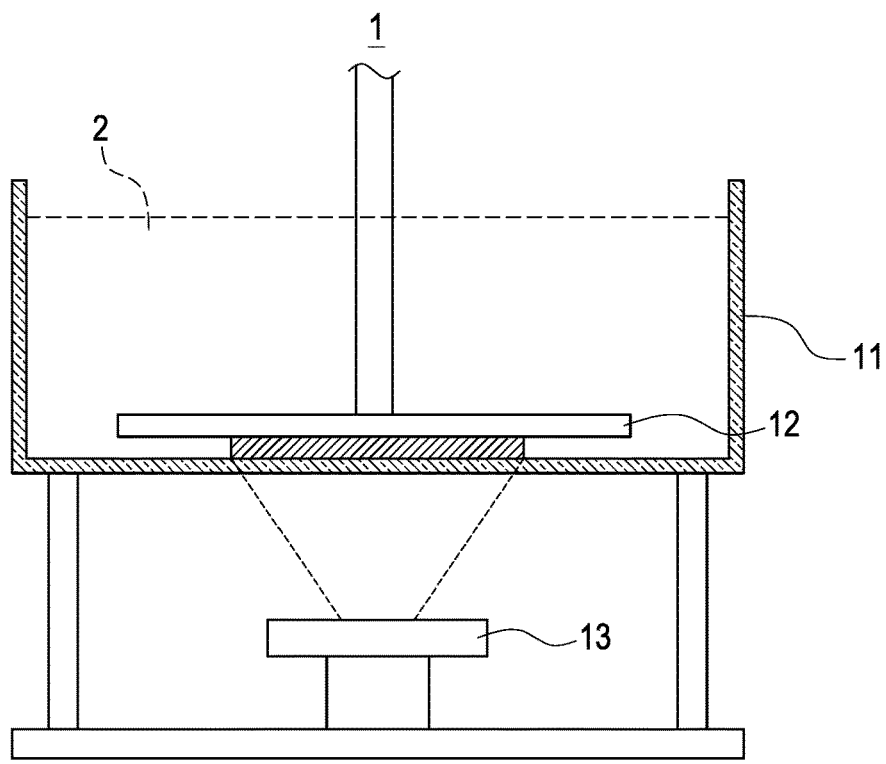
FIG. 1 is a schematic diagram of a 3D printer of the present invention.

FIG. 1 is a schematic diagram of a 3D printer of the present invention. The present invention discloses a 3D printer capable of multiple sub-printing actions (referred to as the 3D printer 1 hereinafter), which is used to execute a sub-printing method. In the embodiment shown in FIG. 1, the 3D printer 1 is exampled as a digital light processing (DLP) type 3D printer, but not limited thereto.

In other embodiments, the sub-printing method of the present invention may also be adopted by other types of 3D printers, for example, laser-based stereolithography (SLA) type 3D printers, powder-bed type 3D printers, fused deposition modeling (FDM) type 3D printers, etc. For the sake of interpretation, a DLP type 3D printer will be taken as an example in the following embodiments.

In the embodiment of FIG. 1, the 3D printer 1 mainly includes a tank 11, a printing platform 12, and an illuminating unit 13. The tank 11 is arranged to contain material liquids 2. In one embodiment, the material liquids 2 may be resin, or any other liquid that may solidify after receiving light, not limited thereto.

Figure 2:
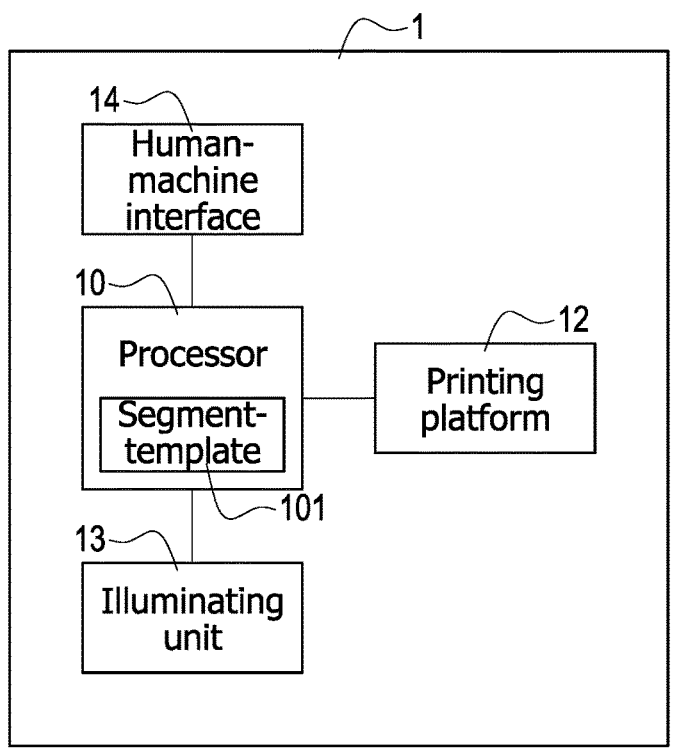
FIG. 2 is a block diagram of the 3D printer of the present invention.

Please refer to FIG. 2, which is a block diagram of the 3D printer of the present invention. As shown in FIG. 2, the 3D printer 1 may further include a processor 10, the processor 10 is electrically connected with the aforementioned printing platform 12 and the illuminating unit 13.

In particular, the printing platform 12 is arranged upon the tank 11, and is controlled by the controller 10 to move downward along a Z axis of the 3D printer 1 to immerse in the material liquids 2 while the 3D printer 1 is performing printing. The illuminating unit 13 is arranged below the tank 11, and is controlled by the processor 10 to illuminate light toward the bottom of the printing platform 12 while the 3D printer 1 is performing printing, so as to solidify parts of the material liquids 2 and transforms the material liquids 2 into a demanded physical object.

The aforementioned actions of each component of the 3D printer 1 are common technical solutions of a regular DLP type 3D printer, which is omitted here.

As shown in FIG. 2, the processor 10 may pre-store a segment-template 101. In one embodiment of the present invention, the processor 10 may obtain a record of slicing data corresponding to one of a plurality of printing layers of a 3D object to be printed, and performs a logical segmentation action on the obtained slicing data according to the segment-template 101, so as to generate a plurality of printing blocks (such as the printing blocks 4 shown in FIG. 5C). The aforementioned printing layers and slicing data are common knowledges in the technical field of 3D printing, which is omitted here.

In this embodiment, the processor 10 may label each of the printing blocks according to a default printing rule after the plurality of printing blocks are generated, so as to decide a printing order for each of the printing blocks. In particular, one or more of the plurality of printing blocks may be labelled with same printing order. When the 3D printer 1 performs a printing action, the one or more printing blocks having the same printing order will be printed simultaneously. For example, if ten printing blocks are labelled with a first printing order, the 3D printer 1 will print these ten printing blocks simultaneously while performing a first printing action (in particularly, is a first sub-printing action out of a complete printing action).

When the 3D printer 1 is performing printing, the processor 10 may control the illuminating unit 13 to separately illuminate light for several times according to the plurality of printing blocks based on the decided printing order. Therefore, the 3D printer 1 may complete the printing action for printing the whole slicing object corresponding to the current printing layer through the multiple illuminating actions (i.e., multiple sub-illuminating actions).

Figure 3:
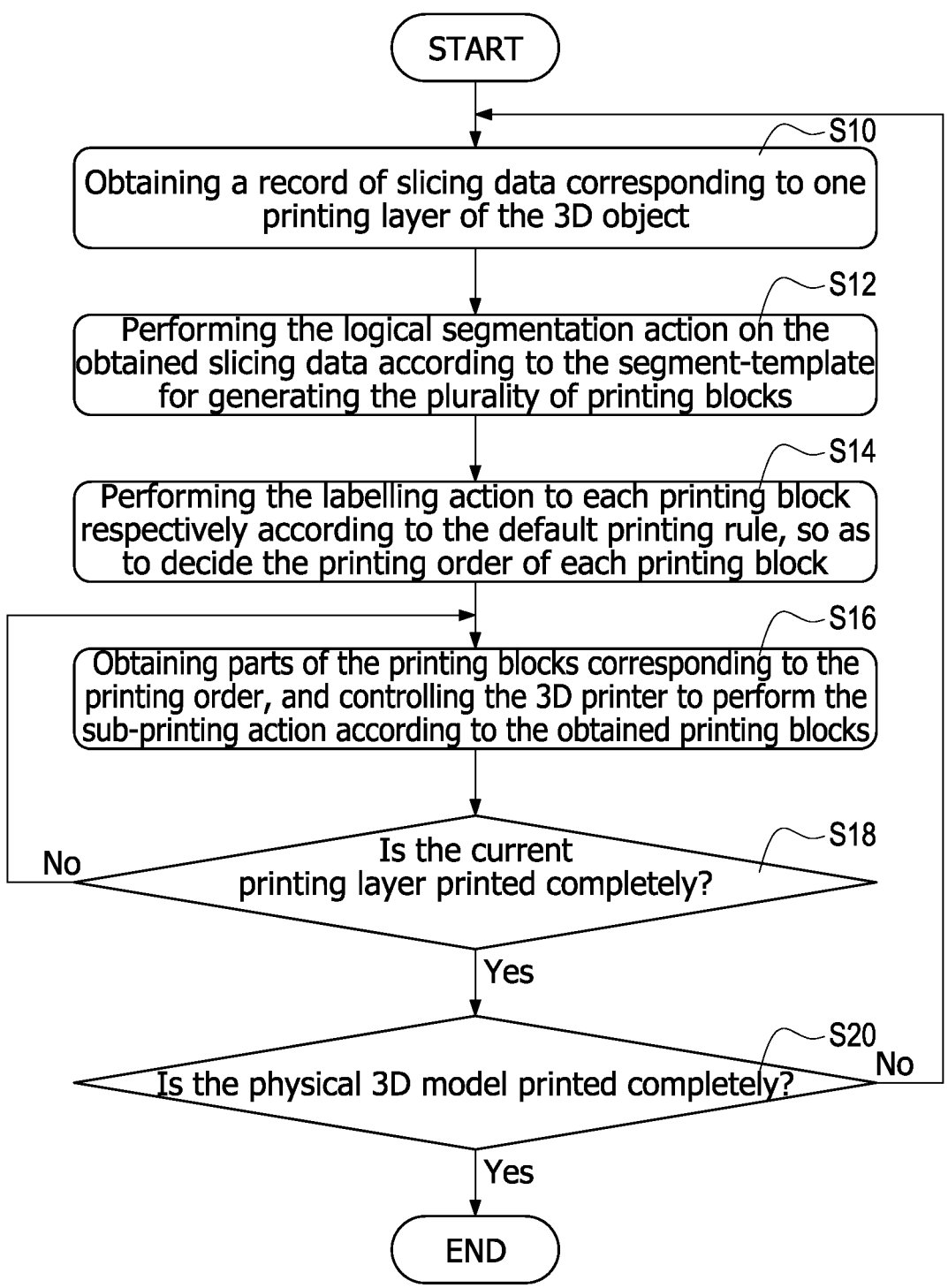
FIG. 3 is a sub-printing flowchart according to a first embodiment of the present invention.

FIG. 3 is a sub-printing flowchart according to a first embodiment of the present invention. FIG. 3 discloses each execution step of a sub-printing method of the present invention, which is adopted by the 3D printer 1 as shown in FIG. 1 and FIG. 2, so as to generate a physical 3D model corresponding to a virtual 3D object. However, the sub-printing method in the present invention is not restricted in this type of 3D printer 1 as shown in FIG. 1 and FIG. 2.

As shown in FIG. 3, when the 3D printer 1 starts to perform a printing action, the processor 10 of the 3D printer 1 first obtains a record of slicing data corresponding to one of multiple printing layers (such as first layer) of a 3D object to be printed (not shown) (step S10). Next, the processor 10 performs a logical segmentation action on the obtained slicing data according to the pre-stored segment-template 101 for generating a plurality of printing blocks (step S12).

In one embodiment, the processor 10 may pre-stored with multiple segment-templates 101 with different styles. In step S12, the processor 10 may automatically choose a suitable one of the segment-templates 101 according to the content of the slicing data, and to perform the logical segmentation action based on the chosen segment-templates 101. As shown in FIG. 2, the 3D printer 1 may further include a human-machine interface (HMI) 14, which is connected with the processor 10. In another embodiment, the HMI 14 may allow a user to manually choose one of the plurality of segment-templates 101, so the processor 10 may apply the user-chosen segment-template 101 to perform the aforementioned logical segmentation action.

Next, the processor 10 performs a labelling action to each of the printing blocks respectively according to a default printing rule, so as to decide the printing order of each printing block (step S14). Next, the processor 10 obtains parts of the plurality of printing blocks according to the decided printing order (such as a first printing order), and controls the 3D printer 1 to perform a sub-printing action (such as a first sub-printing action) according to the obtained multiple corresponding printing blocks (step S16). For example, the processor 10 controls the illuminating unit 13 to perform a first sub-illuminating action according to the multiple corresponding printing blocks which are labelled with the first printing order.

After step S16, the processor 10 determines if the current printing layer is printed completely (step S18). If the current printing layer is not completed yet (i.e., parts of the printing blocks are not used yet), the processor 10 again executes the step S16, so as to obtain another parts of the plurality of printing blocks corresponding to next printing order (such as a second printing order), and controls the 3D printer 1 to perform next sub-printing action (such as a second sub-printing action) according to the obtained multiple corresponding printing blocks. For example, the processor 10 controls the illuminating unit 13 to perform a second sub-illuminating action according to the multiple corresponding printing blocks which are labelled with the second printing order.

In this embodiment, parts of the printing blocks having the same printing order are lack of a face-contact relationship (for example, the parts of the printing blocks having the same printing order only have a point-contact relationship with each other, or they probably don't even contact with each other). The sub-printing method of the present invention is to separately print multiple printing blocks having a small square measure by several times and uses the multiple printing blocks to constitute an entire slicing object, so as to ensure a minimum pulling and dragging strength among the multiple printing blocks while printing the printing blocks at the same time. Therefore, the method can prevent the entire slicing object that has a big square measure from occurring warping or deformation due to the pulling and dragging caused by the temperature or the stressing and/or the shrinking generated when directly printing the whole slicing object at one time.

If the processor 10 determines in step S18 that the current printing layer is printed completely (i.e., all the printing blocks are used), it further determines if the physical 3D model corresponding to the 3D object is printed completely or not (step S20), i.e., the processor 10 determines whether all printing layers of the 3D object are printed completely.

If the physical 3D model corresponding to the 3D object is not completed, the processor 10 again executes the step S10 to the step S18, so as to perform the sub-printing actions for the next printing layer of the 3D object. The aforementioned description only takes the first printing layer of the 3D object for an example, but the step S10 to the step S18 in FIG. 3 can be adopted for all printing layers (such as one thousand printing layers) of the 3D object. On the other hand, the 3D printer 1 may terminate the printing action after the physical 3D model is printed completely.

Figure 4:
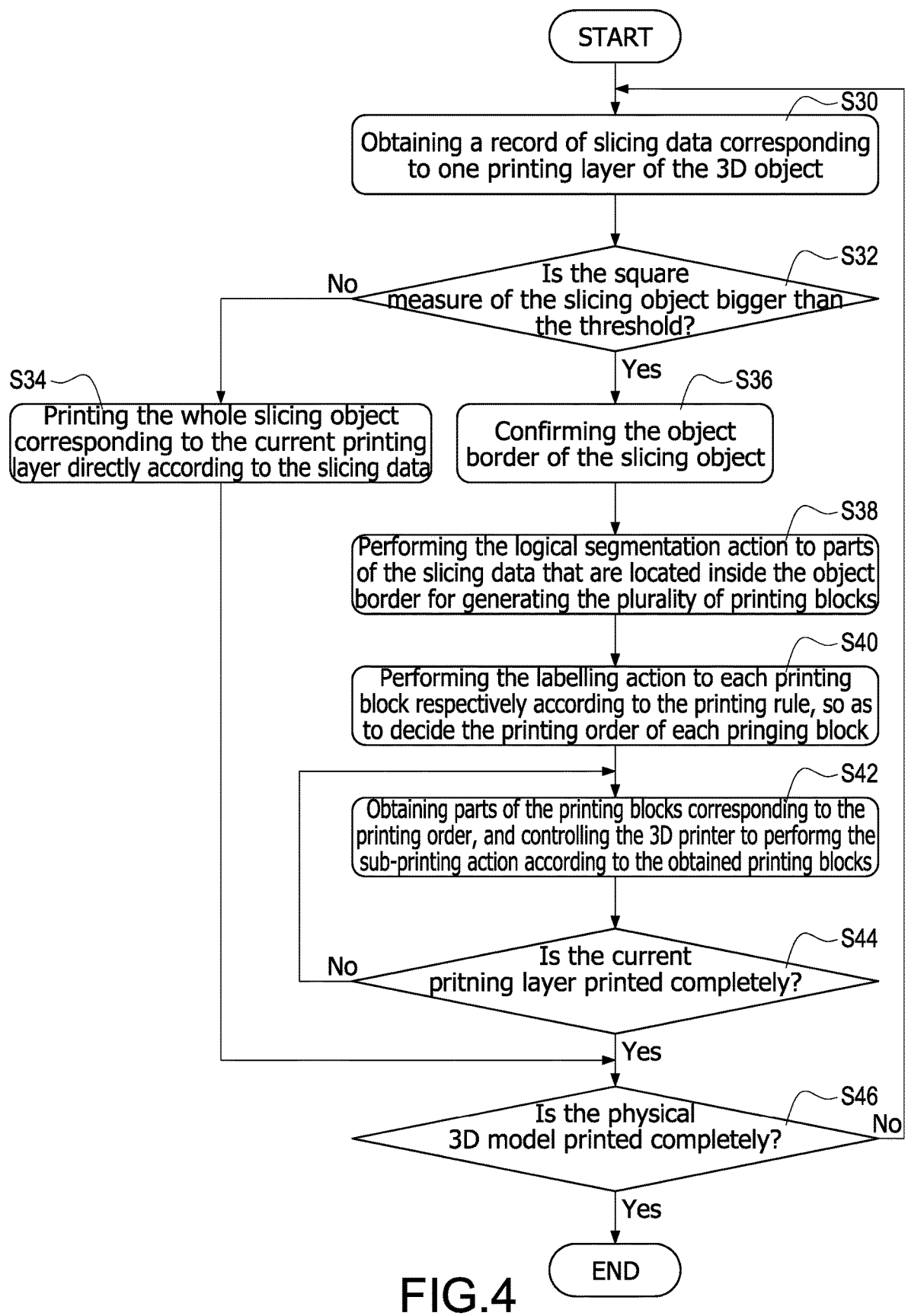
FIG. 4 is a sub-printing flowchart according to a second embodiment of the present invention.

FIG. 4 is a sub-printing flowchart according to a second embodiment of the present invention. In the second embodiment shown in FIG. 4, the processor 10 first obtains a record of slicing data corresponding to one of a plurality of printing layers of a 3D object to be printed (step S30). Next, the processor 10 determines, according to the content of the slicing data, if the square measure of a slicing object corresponding to the current printing layer is bigger than a threshold (step S32). The slicing object mentioned here may be, for example, a slicing object 31 shown in FIG. 5A.

In this embodiment, the processor 10 executes the aforementioned logical segmentation action only if the square measure of the slicing object is determined bigger than the default threshold. If the square measure of the slicing object is determined not bigger than the threshold, the processor 10 will then directly print the whole slicing object corresponding to the current printing layer according to the obtained slicing data of the printing layer at one time (step S34).

In particular, the R&D members may test each type of 3D printer and each type of material in advance, so as to find out the minimum size that may probably be affected by the stressing, pulling, dragging or temperature while printing, and sets the minimum size as the aforementioned threshold. If the square measure of the slicing object is smaller than the threshold, even if the 3D printer 1 prints the entire slicing object directly according to the slicing data by one-time printing action, the printed slicing object will not occur the warping or deformation phenomenon.

Otherwise, if the square measure of the slicing object is bigger than the threshold, the slicing object may occur the warping or deformation phenomenon if it is printed by the 3D printer 1 by one-time printing action. For obviating the problem, the 3D printer 1 may adopt the sub-printing method of the present invention to perform several times of sub-printing actions for printing the entire slicing object.

If the processor 10 determines in step S32 that the square measure of the slicing object is bigger than the threshold, the processor 10 confirms an object border (such as an object border 30 shown in FIG. 5B) of the slicing object according to the content of the slicing data (step S36). In this embodiment, the processor 10 only performs the logical segmentation action to parts of the slicing data that are located inside the object border for generating the plurality of printing blocks (step S38). In particular, the rest parts of the slicing data that are located outside the object border are irrelated with the slicing object, so the processor 10 can ignore these parts of data without harming the printed slicing object.

General speaking, the size of the slicing data of one printing layer should corresponding to the size of the entire printing platform 12. In the embodiment as shown in FIG. 3, the processor 10 performs the logical segmentation action to the entire slicing data, so the processor 10 needs to take longer process time and to bear higher work loading. In the embodiment as shown in FIG. 4, the processor 10 only performs the logical segmentation action to parts of the slicing data that are located inside the object border, so the efficiency of the processor 10 is raised, the process time of the processor 10 is shorten, and the work loading of the processor 10 is effectively reduced.

After step S38, the processor 10 performs the labelling action to each of the printing blocks respectively according to the aforementioned printing rule, so as to decide the printing order of each printing block (step S40). Next, the processor 10 obtains parts of the printing blocks corresponding to the decided printing order, and controls the 3D printer 1 to performing a sub-printing action according to the obtained parts of printing blocks (step S42). Next, the processor 10 determines if the current printing layer is printed completely (step S44). Before the current printing layer is completed, the processor 10 again executes the step S42 for obtaining another parts of the printing blocks corresponding to next printing order and controlling the 3D printer 1 to perform another sub-printing action according to the obtained another parts of printing blocks, and so on.

If the processor 10 determines, in the step S44, that all printing blocks of the current printing layer are printed completely, the processor 10 further determines whether the physical 3D model corresponding to the 3D object is printed completely or not (step S46). If the physical 3D model is not yet completed, the processor 10 again executes the step S30 to the step S44 for performing the sub-printing actions for next printing layer of the 3D object. Otherwise the 3D printer 1 may terminate the current printing action after the physical 3D model is printed completed.

In particular, the step S40 to the step S46 in FIG. 4 is same as or similar to the step S14 to the step S20 in FIG. 3, detailed description is omitted.

Please refer to FIG. 5A to FIG. 5F, FIG. 5A to FIG. 5F are diagrams showing a first printing action to a sixth printing action according to a first embodiment of the present invention.

Figure 5A:
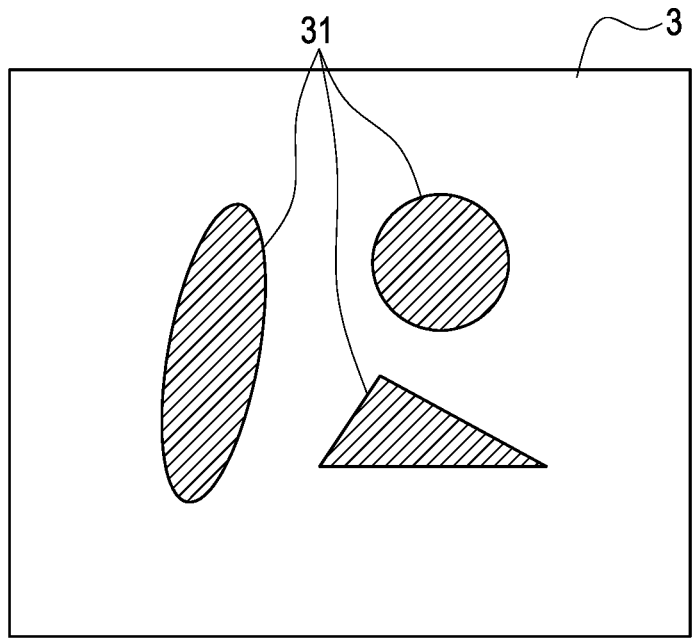
FIG. 5A is a diagram showing a first printing action according to a first embodiment of the present invention.

FIG. 5A discloses a record of slicing data 3 corresponding to one of a plurality of printing layers of a 3D object. As shown in FIG. 5A, the slicing data 3 is recorded with data related to a slicing object 31 of the current printing layer.

Figure 5B:
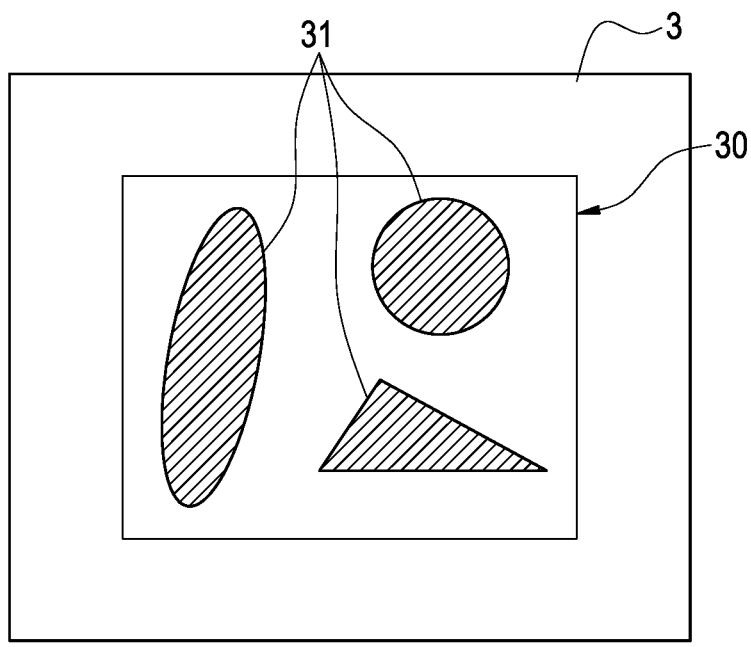
FIG. 5B is a diagram showing a second printing action according to the first embodiment of the present invention.
Figure 5C:
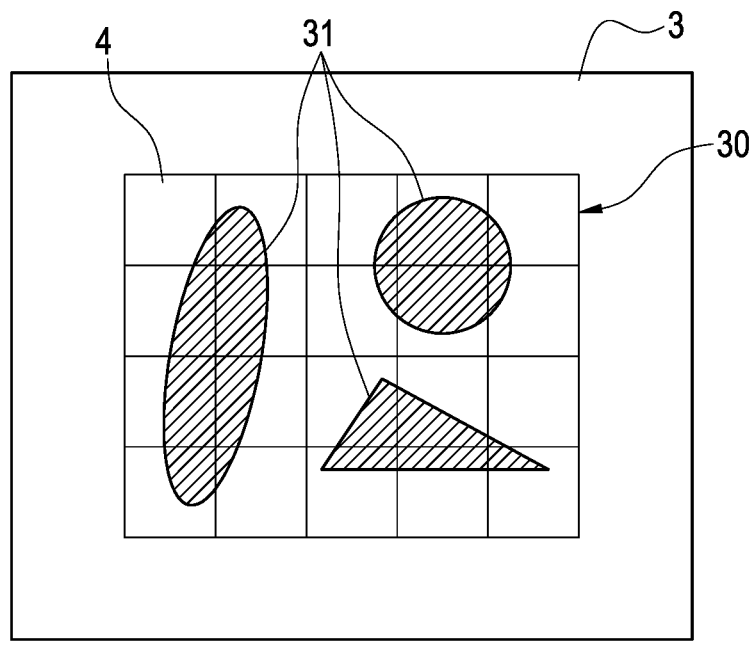
FIG. 5C is a diagram showing a third printing action according to the first embodiment of the present invention.

As shown in FIG. 5B, for reducing the work loading of the processor 10 and shorten the execution time of the logical segmentation action, the processor 10 may first confirm the object border 30 of the slicing object 31 according to the content of the slicing data 3 (i.e., the position of the slicing object 31). Therefore, as shown in FIG. 5C, the processor 10 can only perform the logical segmentation action to parts of the slicing data 3 that are located inside the object border 30 and ignore the rest parts of the slicing data 3 that are located outside the object border 30.

It should be noted that the processor 10 in the present invention is to perform the logical segmentation action to the slicing data according to the segment-template 101 for generating the plurality of printing blocks 4. As shown in FIG. 5C, each segmented printing block 4 may have same size and same shape. In the embodiment of FIG. 5A to FIG. 5F, the segment-template 101 is a square template, and the processor 10 will generates a plurality of square printing blocks 4 with exact same size after performing the logical segmentation action.

Figure 5D:
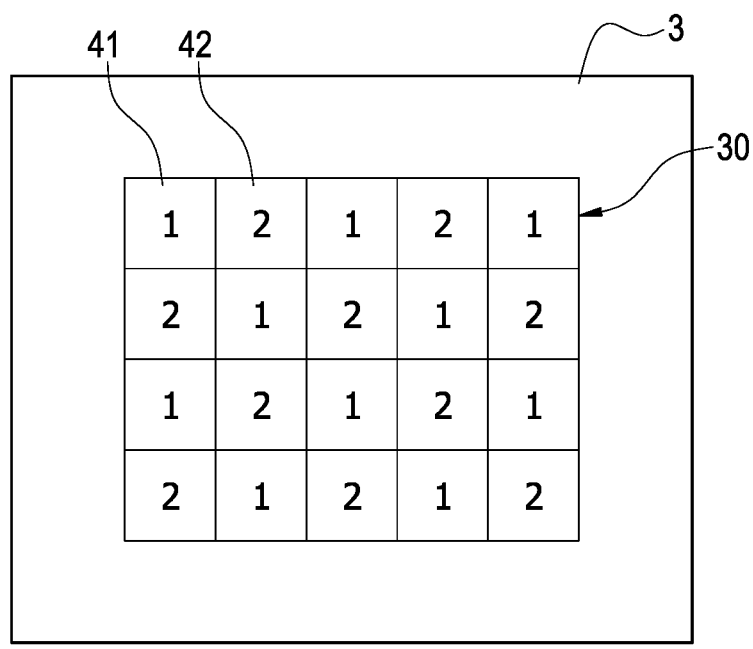
FIG. 5D is a diagram showing a fourth printing action according to the first embodiment of the present invention.

Next, as shown in FIG. 5D, the processor 10 performs a labelling action to each of the printing blocks 4 according to the default printing rule, so as to decide the printing order of each printing blocks 4. In the embodiment shown in FIG. 5D, the processor 10 takes parts of the printing blocks 4 that are close to each other but don't have a face-contact relationship (may only have a point-contact relationship) and labels these printing blocks 4 with same printing order. Therefore, the processor 10 translates the plurality of printing blocks 4 into multiple first printing blocks 41 (labelled as "1") and multiple second printing blocks 42 (labelled as "2").

It should be mentioned that for preventing the entire slicing object from deformation due to the pulling and dragging caused by the stressing and/or the shrinking generated when printing and forming each of the printing blocks 4, this embodiment of the present invention labels each two adjacent printing blocks 4 having a face-contact relationship respectively with different printing orders (for example in FIG. 5D, if one printing block 4 is labelled with a first printing order "1", then four printing blocks 4 which have the face-contact relationship with four faces of this printing block 4 are not being labelled with the first printing order, but another four printing blocks 4 adjacent to each corner of the printing block 4 and lake of the face-contact relationship wherewith will be labelled as the same first printing order). Therefore, the processor 10 may then obtain the label result as shown in FIG. 5D.

According to the labelling approach mentioned above, the processor 10 may ensure that parts of the printing blocks 4 being printed simultaneously by same sub-printing action are not having the face-contact relationship with each other (as shown in FIG. 5D, only have the point-contact relationship, or don't even contact with each other), so as to prevent the printed object from deformation while printing.

Figure 5E:
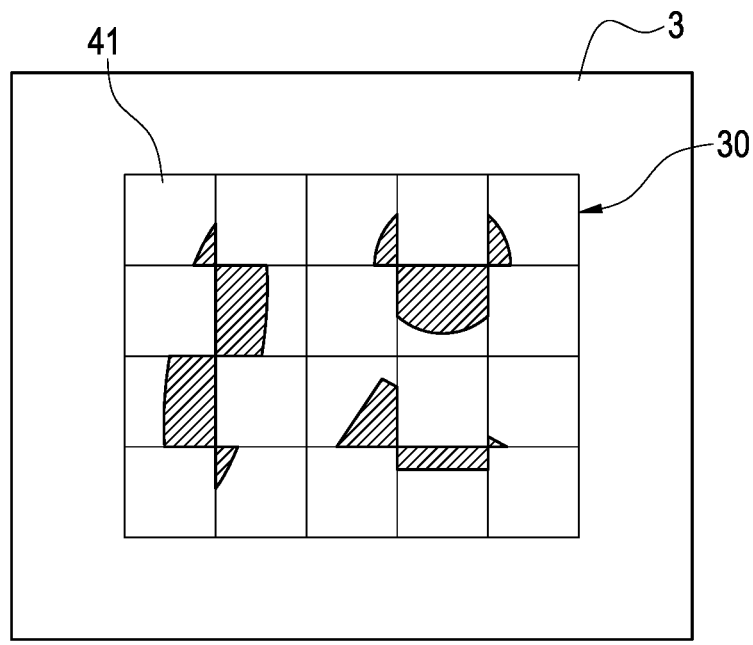
FIG. 5E is a diagram showing a fifth printing action according to the first embodiment of the present invention.
Figure 5F:
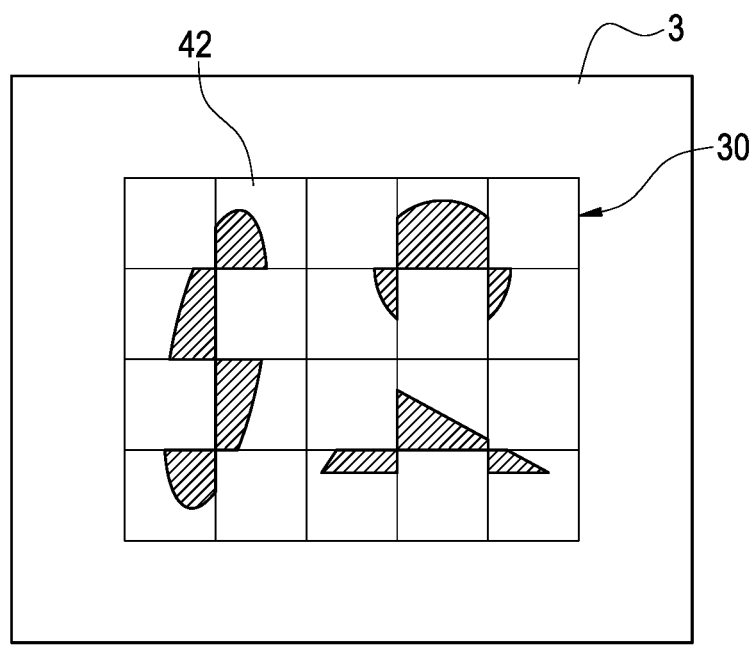
FIG. 5F is a diagram showing a sixth printing action according to the first embodiment of the present invention.

After all of the printing blocks 4 are labelled with the printing order, then as shown in FIG. 5E, the processor 10 first controls the 3D printing 1 to print a corresponding slicing object according to multiple first printing blocks 41 labelled with a first printing order (i.e., to perform a first sub-printing action). Next, as shown in FIG. 5F, the processor 10 then controls the 3D printer 1 to print another corresponding slicing object according to multiple second printing blocks 42 labelled with a second printing order (i.e., to perform a second sub-printing action).

In this embodiment, the plurality of printing blocks 4 are multiple square blocks with exact same size, the processor 10 may divide all of the printing blocks 4 into the first printing blocks 41 and the second printing blocks 42 based on the aforementioned printing rule. Therefore, the 3D printer 1 only need to perform twice of the sub-printing actions (i.e., the aforementioned first sub-printing action and second sub-printing action) to finish the entire slicing object of one printing layer.

Please refer to FIG. 6A to FIG. 6F, FIG. 6A to FIG. 6F are diagrams showing a first printing action to a sixth printing action according to a second embodiment of the present invention. The difference between the second embodiment and the above first embodiment is that the segment-template 101 adopted in the second embodiment is a triangular template, so the processor 10 will generates a plurality of triangular printing blocks 4 with same size after performing the logical segmentation action.

Figure 6A:
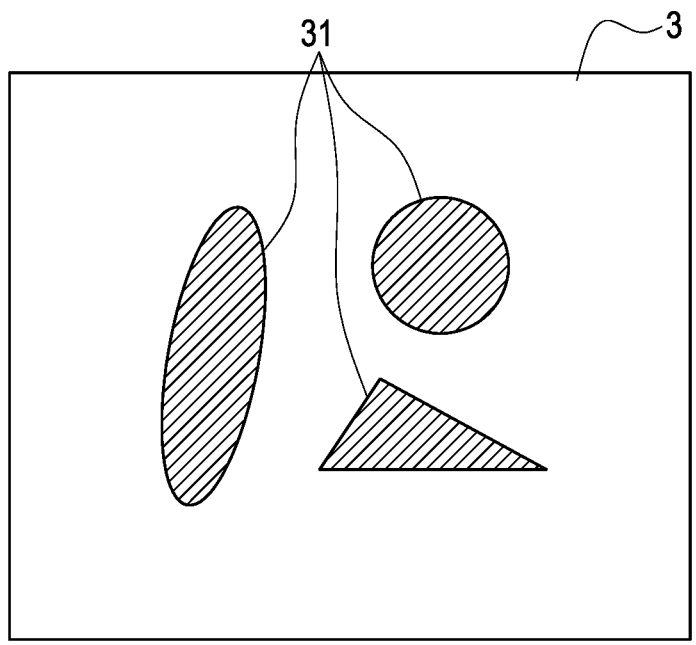
FIG. 6A is a diagram showing a first printing action according to a second embodiment of the present invention.
Figure 6B:
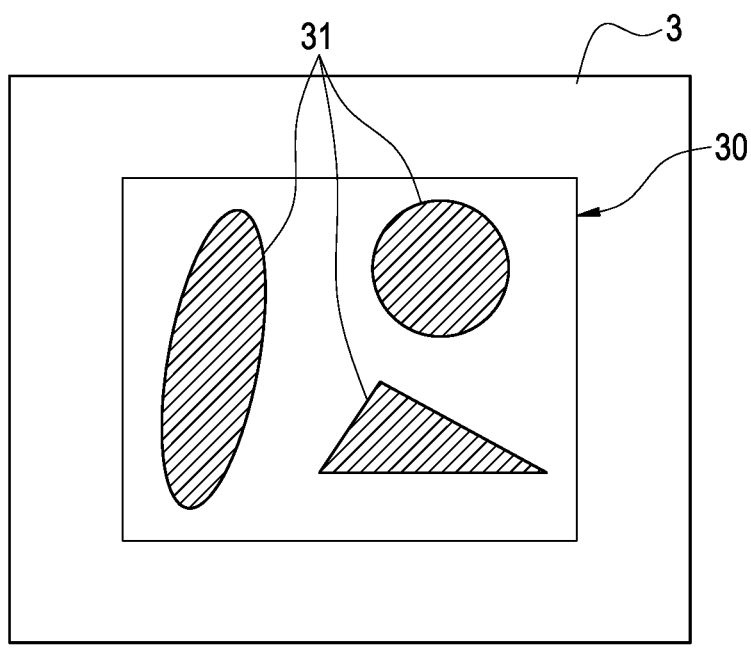
FIG. 6B is a diagram showing a second printing action according to the second embodiment of the present invention.
Figure 6C:
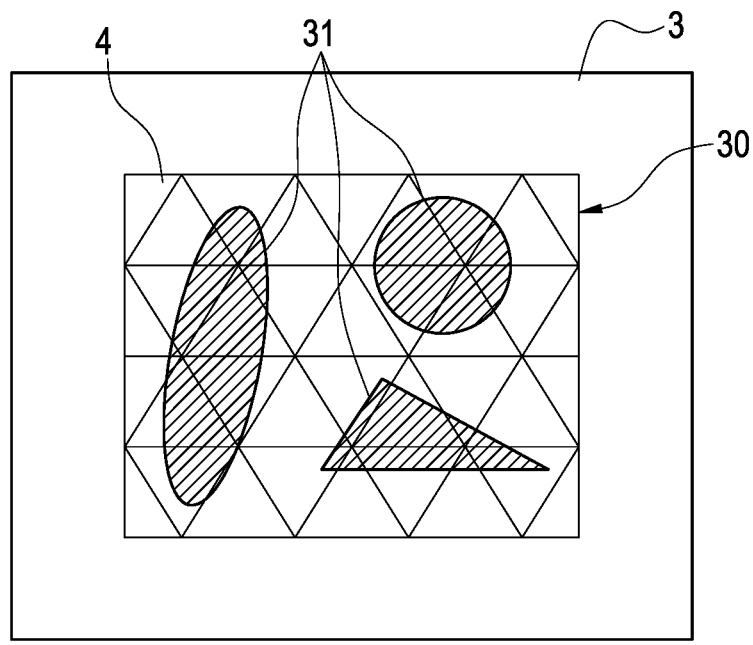
FIG. 6C is a diagram showing a third printing action according to the second embodiment of the present invention.
Figure 6D:
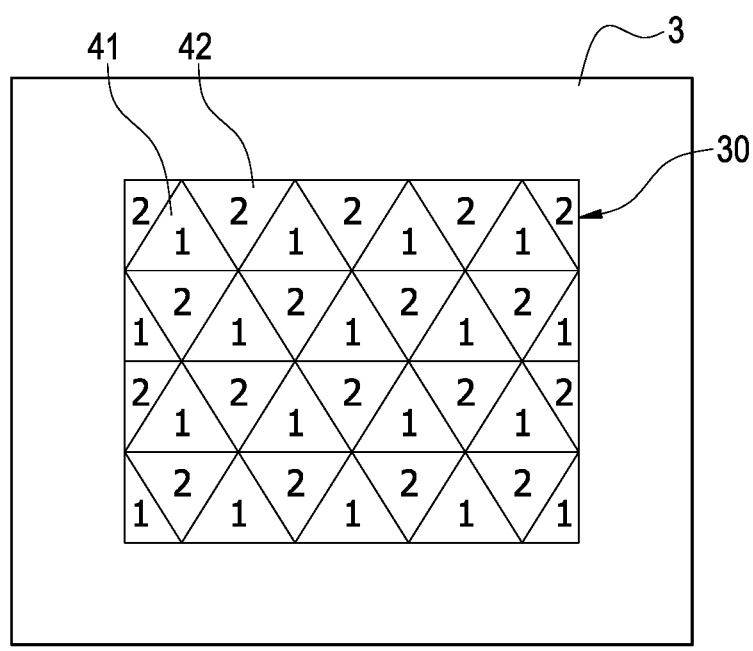
FIG. 6D is a diagram showing a fourth printing action according to the second embodiment of the present invention.
Figure 6E:
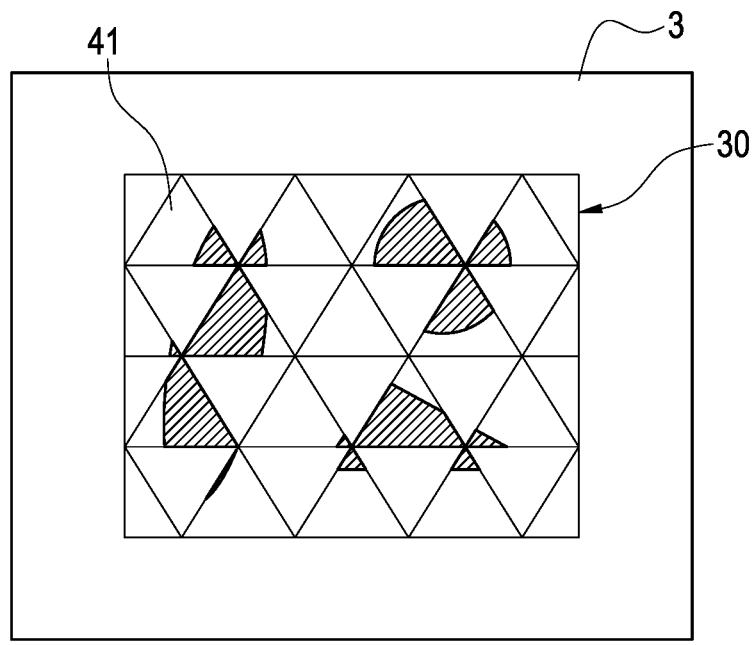
FIG. 6E is a diagram showing a fifth printing action according to the second embodiment of the present invention.
Figure 6F:
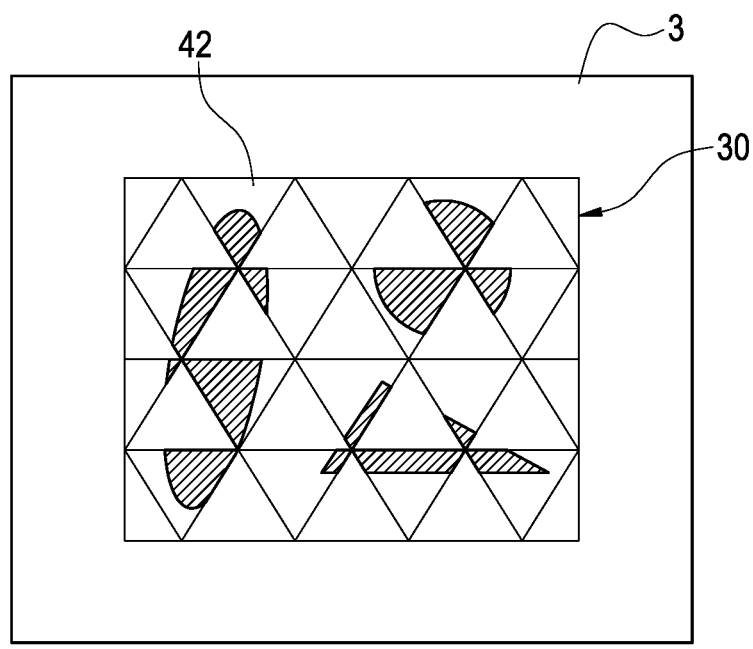
FIG. 6F is a diagram showing a sixth printing action according to the second embodiment of the present invention.

For preventing the entire slicing object from deformation due to the pulling and dragging caused by the stressing and/or the shrinking generated when printing and forming each of the printing blocks 4, the processor 10 in the second embodiment still labels each two adjacent printing blocks 4 having a face-contact relationship respectively with different printing orders (as shown in FIG. 6D, if a first printing block 4 is labelled with a first printing order "1", then three printing blocks 4 which have the face-contact relationship with three faces of this printing block 4 are not labelled with the first printing order). Therefore, the processor 10 may obtain the label result as shown in FIG. 6D.

The second embodiment shown in FIG. 6A to FIG. 6F is similar to the first embodiment shown in FIG. 5A to FIG. 5F (the only difference appears in the shape of the printing blocks), the detailed description is omitted here.

In the second embodiment, the plurality of printing blocks 4 are triangular blocks with exact same size, so the processor 10 may divide all of the printing blocks 4 into multiple first printing blocks 41 (labelled with a first printing order "1") and multiple second printing blocks 42 (labelled with a second printing order "2") based on the aforementioned printing rule. Therefore, the 3D printer 1 only need to perform twice of the sub-printing actions to finish the entire slicing object of one printing layer.

In particular, the 3D printer 1 is to perform a first sub-printing action according to the multiple first printing blocks 41 labelled with the first printing order, and then performs a second sub-printing action according to the multiple second printing blocks 42 labelled with the second printing order. For example, the 3D printer 1 may first control the illuminating unit 13 to illuminate light toward the corresponding position on the bottom of the printing platform 12 according to the multiple first printing blocks 41 for implementing the first sub-printing action, and then controls the illuminating unit 13 to illuminate light toward another corresponding position on the bottom of the printing platform 12 according to the multiple second printing blocks 42 for implementing the second sub-printing action. After the illuminating unit 13 finishes its illuminating action twice, a slicing object 31 as described in FIG. 6A will be formed on the printing platform 12.

Please refer to FIG. 7A to FIG. 7G, FIG. 7A to FIG. 7G are diagrams showing a first printing action to a seventh printing action according to a third embodiment of the present invention. The difference between the third embodiment and the above first embodiment and second embodiment is that the segment-template 101 adopted in the third embodiment is a hexagonal template, so the processor 10 will generates a plurality of hexagonal printing blocks 4 with same size after performing the logical segmentation action.

Figure 7A:
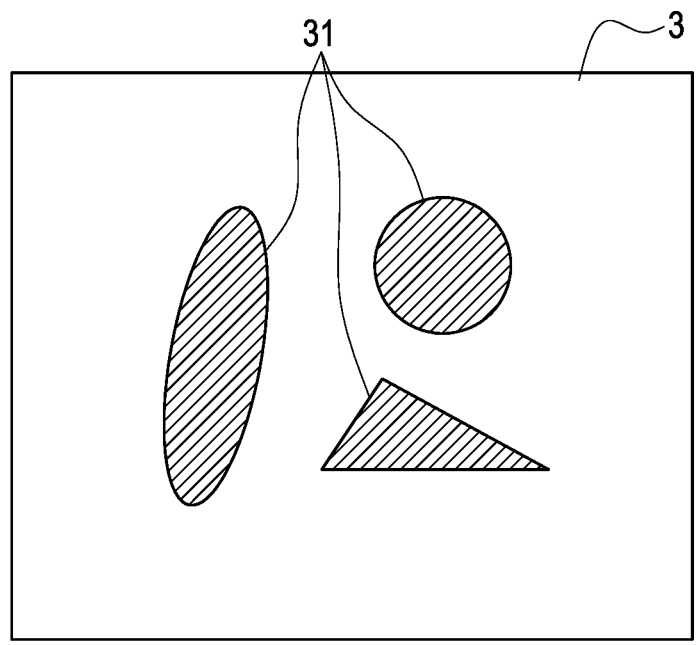
FIG. 7A is a diagram showing a first printing action according to a third embodiment of the present invention.
Figure 7B:
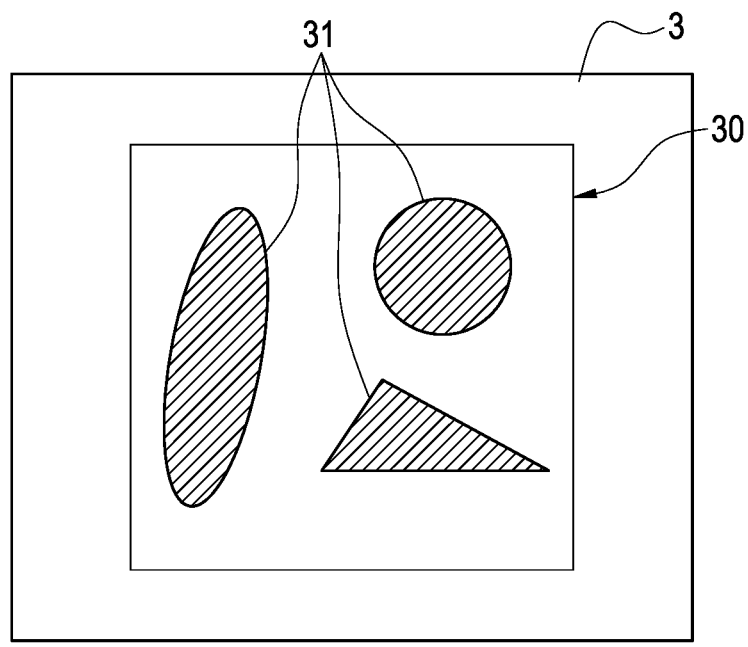
FIG. 7B is a diagram showing a second printing action according to the third embodiment of the present invention.

As shown in FIG. 7A, when the 3D printer 1 performs printing, the processor 10 first obtains a record of slicing data 3 corresponding to one of a plurality of printing layers of a 3D object to be printed, wherein the obtained slicing data 3 is recorded with data related to a slicing object 31 of the current printing layer. Next, as shown in FIG. 7B, the processor 10 confirms an object border 30 of the slicing object 31.

Figure 7C:
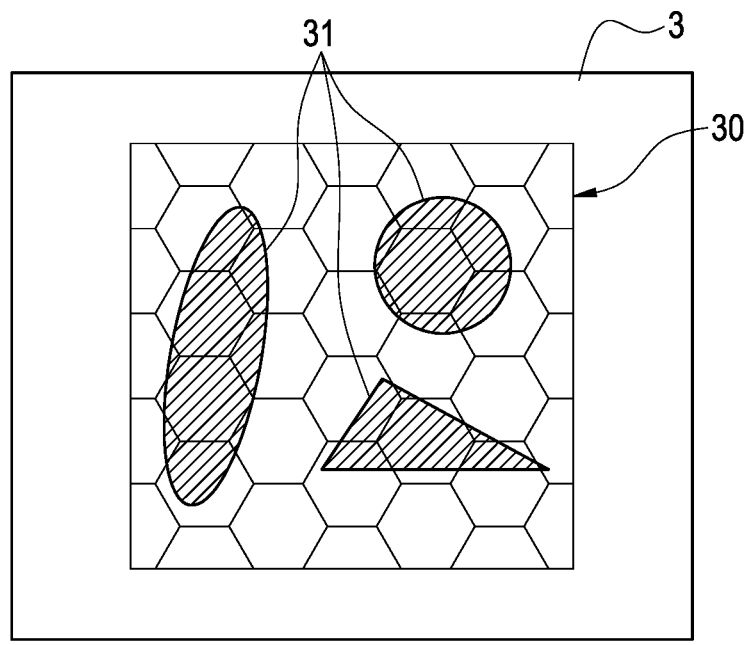
FIG. 7C is a diagram showing a third printing action according to the third embodiment of the present invention.

Next, as shown in FIG. 7C, the processor 10 performs the logical segmentation action to the slicing object 31 according to the segment-template 101 (i.e., the hexagonal template in the third embodiment) for generating the plurality of printing blocks 4.

Figure 7D:
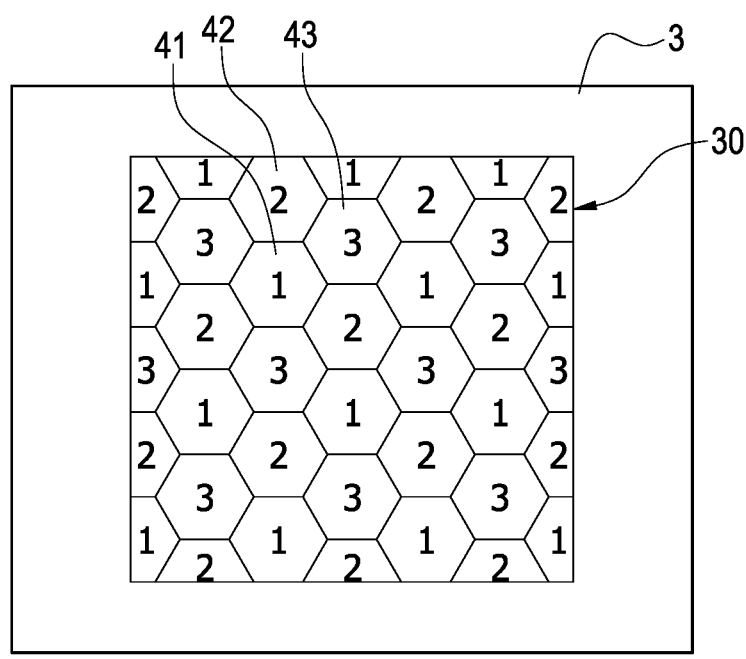
FIG. 7D is a diagram showing a fourth printing action according to the third embodiment of the present invention.

As shown in FIG. 7C, the plurality of printing blocks 4 in the third embodiment are hexagonal blocks with exact same size. Thus, as shown in FIG. 7D, the processor 10 may label each of the printing blocks 4 respectively with a first printing order, a second printing order, and a third printing order according to the aforementioned printing rule (i.e. to label each two adjacent printing blocks 4 having a face-contact relationship with different printing orders), so as to divide all of the printing blocks 4 into multiple first printing blocks 41 (labelled with the first printing order "1"), multiple second printing blocks 42 (labelled with the second printing order "2"), and multiple third printing blocks 43 (labelled with the third printing order "3"). In other words, the 3D printer 1 in the third embodiment only needs to perform three times of the sub-printing actions to finish the entire slicing object of one printing layer.

Figure 7E:
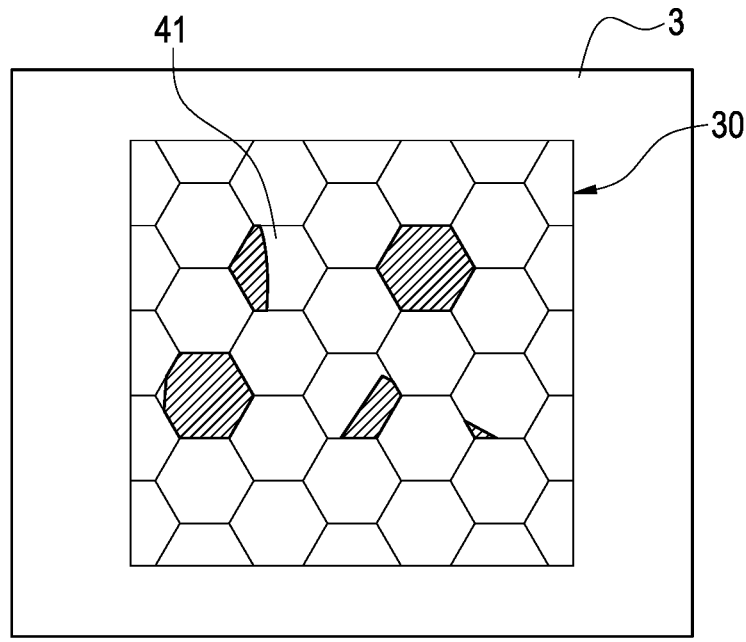
FIG. 7E is a diagram showing a fifth printing action according to the third embodiment of the present invention.
Figure 7F:
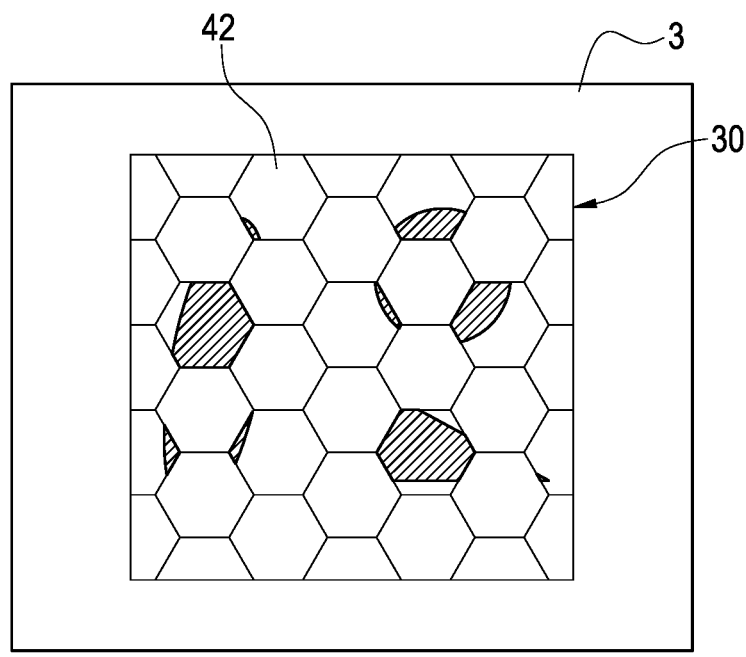
FIG. 7F is a diagram showing a sixth printing action according to the third embodiment of the present invention.
Figure 7G:
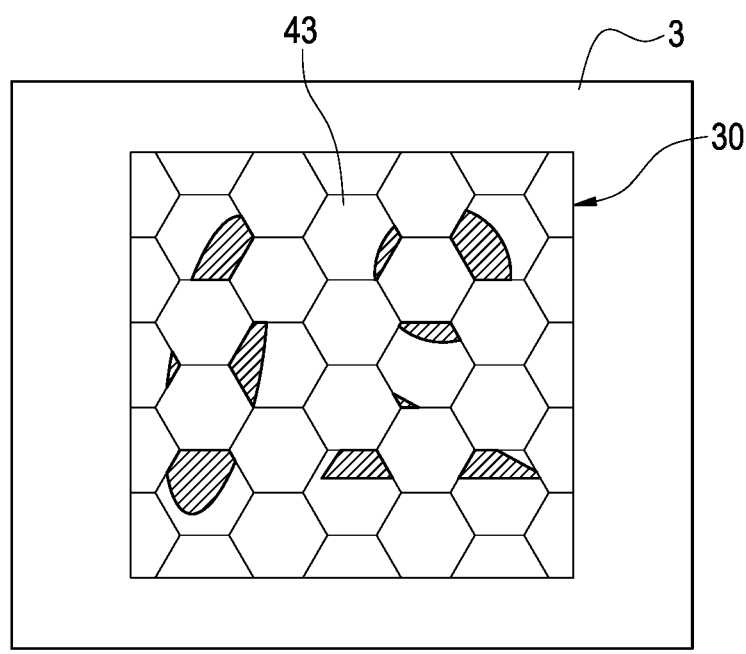
FIG. 7G is a diagram showing a seventh printing action according to the third embodiment of the present invention.

In particular, as shown in FIG. 7E, after all of the printing blocks 4 are labelled with the printing order, the processor 10 first controls the 3D printer 1 to print a corresponding slicing object according to the multiple first printing blocks 41 labelled with the first printing order (i.e., to perform a first sub-printing action). Next, as shown in FIG. 7F, the processor 10 then controls the 3D printer 1 to print another corresponding slicing object according to the multiple second printing blocks 42 labelled with the second printing order (i.e., to perform a second sub-printing action). Finally, as shown in FIG. 7G, the processor 10 further controls the 3D printer 1 to print a further corresponding slicing object according to the multiple third printing blocks 43 labelled with the third printing order (i.e., to perform a third sub-printing action). Therefore, the 3D printer 1 may constitute the entire slicing object of the current printing layer based on the separately printed first printing blocks 41, second printing blocks 42, and third printing blocks 43.

The aforementioned embodiments only use square printing blocks, triangular printing blocks and hexagonal printing blocks for examples, however, the plurality of printing blocks 4 may be arbitrary polygonal blocks in other embodiments, not limited thereto.

Figure 8:
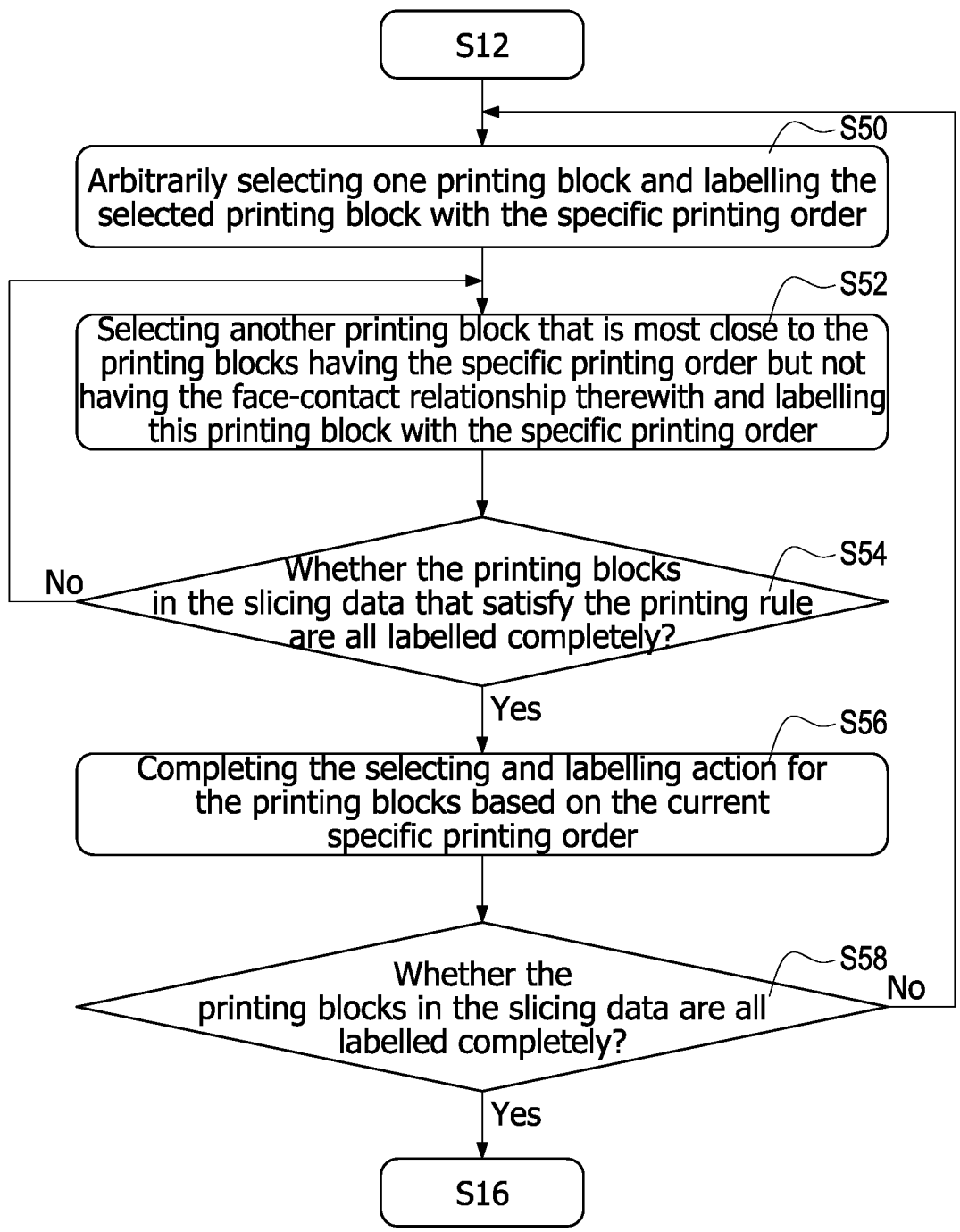
FIG. 8 is a flowchart for labelling printing blocks according to a first embodiment of the present invention.

Please refer to FIG. 8, which is a flowchart for labelling printing blocks according to a first embodiment of the present invention. FIG. 8 is used to further describe how the processor 10 decides and labels the printing order for each of the printing blocks after the plurality of printing blocks are generated.

As shown in FIG. 8, after the step S12 of FIG. 3 or the step S38 in FIG. 4, the processor 10 may generate the aforementioned plurality of printing blocks. Next, the processor 10 first arbitrarily selects one of the plurality of printing blocks and labels the selected printing block with a specific printing order (for example, a first printing order) (step S50). Next, the processor 10 selects another printing block that is most close to the one or more printing blocks having the specific printing order but not having a face-contact relationship therewith and labels this selected printing block with the specific printing order (step S52).

After step S52, the processor 10 determines whether the plurality of printing blocks in the slicing data that satisfy the aforementioned printing rule are all labelled completely (step S54). In particular, the printing rule in this embodiment is the selection condition described and adopted in the step S52.

If the processor 10 determines negative (No) in the step S54, the processor 10 again executes the step S52 for continuing selecting and labelling another printing block with the same specific printing order (such as the first printing order). If the processor 10 determines positive (Yes) in the step S54, then the processor 10 may complete the selecting and labelling action for the printing blocks based on the current specific printing order (step S56).

Next, the processor 10 determines whether the printing blocks in the slicing data are all labelled completely (step S58), i.e., whether every printing block is labelled with a printing order or not. If the processor 10 determines negative (No) in the step S58, the processor 10 again executes the step S50 to the step S56, for selecting and labelling other parts of the printing blocks for next printing order (such as a second printing order, a third printing order, and so on). If the processor 10 determines positive (Yes) in the step S58, the processor 10 may further execute the step S16 in FIG. 3 or the step S S42 in FIG. 4, so as to control the 3D printer 1 to separately perform the sub-printing actions for printing the slicing object of the current printing layer.

By using the technical solution provided by the present invention, a 3D printer may separately perform several times of sub-printing actions to print an entire slicing object with a big square measure, so as to prevent the printed slicing object from being deformation or warping.

As the skilled person will appreciate, various changes and modifications can be made to the described embodiment. It is intended to include all such variations, modifications and equivalents which fall within the scope of the present invention, as defined in the accompanying claims.

What is claimed is:

1. A sub-printing method, adopted by a 3D printer (1) for printing a physical 3D model corresponding to a 3D object, the 3D printer (1) comprising a processor (10), a tank (11) arranged to contain material liquids (2), a printing platform (12) arranged upon the tank (11) for being controlled by the processor (10) to immerse in the material liquids (2), and an illuminating unit (13) arranged below the tank (11) for being controlled by the processor (10) to illuminate light toward a bottom of the printing platform (12), the sub-printing method comprising following steps:
 a) obtaining a record of slicing data (3) corresponding to one of a plurality of printing layers of the 3D object by the processor (10);
 b) performing a logical segmentation action to the slicing data (3) according to a segment-template (101) for generating a plurality of printing blocks (4) by the processor (10);
 c) performing a labelling action respectively to each of the printing blocks (4) according to a printing rule for deciding at least two printing orders of each of the printing blocks (4) by the processor (10);
 d1) controlling the illuminating unit (13) to perform a sub-illuminating action according to part of the plurality of printing blocks (4) labelled as a first printing order of the decided at least two printing orders;
 d2) controlling the illuminating unit (13) to perform the sub-illuminating action again according to part of the plurality of printing blocks (4) labelled as a next printing order of the decided at least two printing orders before all of the plurality of printing blocks (4) of the slicing data (3) are completed printed;
 e) determining whether the physical 3D model is printed completely after the plurality of printing blocks (4) of the slicing data (3) are all printed completely; and
 f) re-executing the step a) to the step d2) before the physical 3D model is printed completely.

2. The sub-printing method in claim 1, wherein the plurality of printing blocks (4) have same size and same shape.

3. The sub-printing method in claim 2, wherein the plurality of printing blocks (4) are square blocks.

4. The sub-printing method in claim 2, wherein the plurality of printing blocks (4) are triangular blocks.

5. The sub-printing method in claim 2, wherein the plurality of printing blocks (4) are hexagonal blocks.

6. The sub-printing method in claim 1, further comprising following steps after step a):
 a1) determining whether a square measure of a slicing object (31) corresponding to the printing layer is bigger than a threshold according to content of the slicing data (3);
 a2) controlling the 3D printer (1) to directly print the entire slicing object (31) according to the slicing data (3) when determining that the square measure of the slicing object (31) is not bigger than the threshold; and
 a3) executing the step b) when determining that the square measure of the slicing object (31) is bigger than the threshold.

7. The sub-printing method in claim 1, further comprising a step b0) before the step b): confirming an object border (30) of a slicing object (31) corresponding to the printing layer according to a content of the slicing data (3);
 wherein, the step b) is to perform the logical segmentation action to parts of the slicing data (3) that are located inside the object border (30).

8. The sub-printing method in claim 1, wherein the step c) comprises following steps:
 c1) arbitrarily selecting one of the plurality of printing blocks (4) and labelling the selected printing block (4) with a specific printing order;
 c2) selecting another one of the plurality of printing blocks (4) that is most close to the one or more printing blocks (4) having the specific printing order and not having a face-contact relationship therewith and labelling the selected printing block (4) with the specific printing order;
 c3) re-executing the step c2) before the specific printing order is labelled completely;
 c4) determining whether the plurality of printing blocks (4) are all labelled completely after the specific printing order is labelled completely; and
 c5) re-executing the step c1) to the step c3) for selecting and labelling other parts of the printing blocks (4) for next printing order before the plurality of printing blocks (4) are all labelled completely.

9. The sub-printing method in claim 1, wherein the 3D printer (1) is a digital light processing (DLP) type 3D printer.

10. A 3D printer capable of multiple sub-printing actions, comprising:
 a processor (10), configured to record a segment-template (101);
 a tank (11), arranged to contain material liquids (2);
 a printing platform (12), arranged upon the tank (11) and electrically connected with the processor (10), configured to be controlled by the processor (10) to immerse in the material liquids (2);
 an illuminating unit (13), arranged below the tank (11) and electrically connected with the processor (10), configured to be controlled by the processor (10) to illuminate light toward a bottom of the printing platform (12);
 wherein, the processor (10) is configured to obtain a record of slicing data (3) corresponding to one of a plurality of printing layers of a 3D object when performing printing, and to perform a logical segmentation action to the slicing data (3) according to the segment-template (101) for generating a plurality of printing blocks (4), and the processor (10) is further configured to perform a labelling action respectively to each of the printing blocks (4) according to a printing rule for deciding at least two printing orders of each of the printing blocks (4);
 wherein, the processor (10) is configured to control the illuminating unit (13) to perform a sub-illuminating action according to part of the plurality printing blocks (4) labelled as a first printing order of the decided at least two printing orders, and then controls the illuminating unit (13) to perform the sub-illuminating action again according to part of the plurality printing blocks (4) labelled as a next printing order of the decided at least two printing orders before all of the plurality of printing blocks (4) of the slicing data (3) are completed printed for printing a slicing object (31) corresponding to the printing layer.

11. The 3D printer in claim 10, wherein the plurality of printing blocks (4) have same size and same shape.

12. The 3D printer in claim 11, wherein the plurality of printing blocks (4) are square blocks, triangular blocks, or hexagonal blocks.

13. The 3D printer in claim 10, wherein the multiple printing blocks (4) with same printing order do not have a face-contact relationship with each other.

14. The 3D printer in claim 10, wherein the processor (10) is configured to determine whether a square measure of the slicing object (31) is bigger than a threshold according to a content of the slicing data (3) and to confirm an object border (30) of the slicing object when the square measure of the slicing object (31) is determined bigger than the threshold, and also configured to perform the logical segmentation action to parts of the slicing data (3) that are located inside the object border (30).

15. The 3D printer in claim 10, wherein the processor (10) is configured to execute following activities in order to decide the printing order of each of the printing blocks (4):
   activity-1: arbitrarily selecting one of the plurality of printing blocks (4) and labelling the selected printing block (4) with a specific printing order;
   activity-2: selecting another one of the plurality of printing blocks (4) that is most close to the one or more printing blocks (4) having the specific printing order and not having a face-contact relationship therewith and labelling the selected printing block (4) with the specific printing order;
   activity-3: re-executing the activity-2 before the specific printing order is labelled completely;
   activity-4: determining whether the plurality of printing blocks (4) are all labelled completely after the specific printing order is labelled completely;
   activity-5: re-executing the activity-1 to the activity-3 for selecting and labelling other parts of the printing blocks (4) for next printing order before the plurality of printing blocks (4) are all labelled completely.

\* \* \* \* \*